US007006661B2

(12) United States Patent
Miller et al.

(10) Patent No.: US 7,006,661 B2
(45) Date of Patent: Feb. 28, 2006

(54) DIGITAL WATERMARKING SYSTEMS AND METHODS

(76) Inventors: Marc D. Miller, P.O. Box 596, Corte Madera, CA (US) 94976; Kenneth L. Levy, 110 NE. Cedar St., Stevenson, WA (US) 98648; Geoffrey B. Rhoads, 2961 SW. Turner Rd., West Linn, OR (US) 97068

(*) Notice: Subject to any disclaimer, the term of this patent is extended or adjusted under 35 U.S.C. 154(b) by 257 days.

(21) Appl. No.: 10/278,742

(22) Filed: Oct. 21, 2002

(65) Prior Publication Data

US 2003/0138127 A1    Jul. 24, 2003

Related U.S. Application Data

(60) Continuation-in-part of application No. 10/017,678, filed on Dec. 13, 2001, which is a continuation of application No. 09/597,209, filed on Jun. 20, 2000, now Pat. No. 6,411,725, which is a continuation-in-part of application No. 09/408,902, filed on Sep. 29, 1999, now Pat. No. 6,408,331, which is a division of application No. 09/130,624, filed on Aug. 6, 1998, now Pat. No. 6,324,573, which is a continuation of application No. 08/508,083, filed on Jul. 27, 1995, now Pat. No. 5,841,978, application No. 10/278,742.

(60) Provisional application No. 60/349,970, filed on Oct. 19, 2001.

(51) Int. Cl.
    *G06K 9/00* (2006.01)

(52) U.S. Cl. ............... 382/100; 380/202; 380/203; 348/460

(58) Field of Classification Search ............... 382/100, 382/232; 380/202, 203, 216, 217, 232, 233, 380/239, 241, 242; 713/150, 169, 170, 171, 713/173, 176, 179, 181, 182, 189, 201; 348/460; 725/31, 87; 705/50, 52, 55, 56, 57, 58; 704/200.1, 704/273; 381/73.1
See application file for complete search history.

(56) References Cited

U.S. PATENT DOCUMENTS

| 4,238,849 A | 12/1980 | Gassman |
| 4,528,588 A | 7/1985 | Lofberg |

(Continued)

FOREIGN PATENT DOCUMENTS

EP          1077570          2/2001

(Continued)

OTHER PUBLICATIONS

U.S. Appl. No. 09/620,019, filed Jul. 20, 2000, Levy.

(Continued)

*Primary Examiner*—Andrew W. Johns
*Assistant Examiner*—Patrick L. Edwards
(74) *Attorney, Agent, or Firm*—Digimarc Corporation (57) ABSTRACT

The present invention relates to digital watermarking systems and methods. In a first implementation, so-called movie studio rough-cuts are watermarked to provide a forensic tracking clue or to provide security for distributed rough-cuts. In another implementation, a watermark is determined for a compressed video object. The watermark is compressed as an object and the watermarked object is then associated with the compressed video object. The two separate objects are provided to a rendering device, which after decompressing both objects, embeds the watermark in the video prior to rendering.

43 Claims, 3 Drawing Sheets

U.S. PATENT DOCUMENTS

| | | | |
|---|---|---|---|
| 4,829,569 A * | 5/1989 | Seth-Smith et al. ........ | 380/234 |
| 5,228,056 A | 7/1993 | Schilling | |
| 5,428,606 A | 6/1995 | Moskowitz | |
| 5,613,004 A | 3/1997 | Cooperman et al. | |
| 5,636,292 A | 6/1997 | Rhoads ........................ | 382/232 |
| 5,646,997 A | 7/1997 | Barton | |
| 5,664,018 A | 9/1997 | Leighton | |
| 5,715,403 A | 2/1998 | Stefik | |
| 5,719,937 A | 2/1998 | Warren | |
| 5,748,763 A | 5/1998 | Rhoads | |
| 5,765,152 A | 6/1998 | Erickson | |
| 5,768,426 A | 6/1998 | Rhoads ........................ | 382/232 |
| 5,774,452 A | 6/1998 | Wolosewicz | |
| 5,809,317 A | 9/1998 | Kogan et al. ............. | 715/501.1 |
| 5,822,436 A | 10/1998 | Rhoads | |
| 5,838,906 A * | 11/1998 | Doyle et al. ................. | 709/202 |
| 5,841,978 A | 11/1998 | Rhoads ........................ | 709/217 |
| 5,845,281 A | 12/1998 | Benson | |
| 5,862,260 A | 1/1999 | Rhoads | |
| 5,892,900 A | 4/1999 | Ginter et al. | |
| 5,901,178 A | 5/1999 | Lee | |
| 5,905,800 A | 5/1999 | Moskowitz et al. | |
| 5,910,987 A | 6/1999 | Ginter et al. ................. | 705/52 |
| 5,933,798 A | 8/1999 | Linnartz | |
| 5,940,504 A | 8/1999 | Griswold | |
| 5,943,422 A | 8/1999 | Van Wie et al. ............. | 705/54 |
| 5,949,885 A * | 9/1999 | Leighton ..................... | 380/54 |
| 5,963,909 A | 10/1999 | Warren | |
| 5,991,876 A | 11/1999 | Johnson et al. | |
| 5,995,625 A | 11/1999 | Sudia | |
| 6,021,491 A * | 2/2000 | Renaud ....................... | 713/179 |
| 6,086,706 A | 7/2000 | Brasil | |
| 6,104,812 A | 8/2000 | Koltai et al. | |
| 6,115,741 A | 9/2000 | Domenikos et al. | |
| 6,122,403 A | 9/2000 | Rhoads ........................ | 382/233 |
| 6,185,312 B1 | 2/2001 | Nakamura et al. | |
| 6,185,683 B1 | 2/2001 | Ginter et al. | |
| 6,192,138 B1 | 2/2001 | Yamadaji | |
| 6,199,076 B1 | 3/2001 | Logan et al. | |
| 6,209,092 B1 | 3/2001 | Linnartz ..................... | 713/176 |
| 6,216,228 B1 | 4/2001 | Chapman | |
| 6,233,684 B1 | 5/2001 | Stefik | |
| 6,236,971 B1 | 5/2001 | Stefik | |
| 6,240,185 B1 | 5/2001 | Van Wie et al. ............. | 380/232 |
| 6,243,480 B1 | 6/2001 | Zhao et al. .................. | 382/100 |
| 6,269,394 B1 * | 7/2001 | Kenner et al. ............... | 709/217 |
| 6,272,176 B1 | 8/2001 | Srinivasan | |
| 6,272,634 B1 | 8/2001 | Tewfik et al. | |
| 6,282,654 B1 | 8/2001 | Ikeda et al. ................. | 713/200 |
| 6,285,774 B1 | 9/2001 | Schumann | |
| 6,314,192 B1 | 11/2001 | Chen et al. | |
| 6,324,573 B1 | 11/2001 | Rhoads ........................ | 709/217 |
| 6,332,031 B1 | 12/2001 | Rhoads et al. | |
| 6,334,187 B1 | 12/2001 | Kadono | |
| 6,351,815 B1 | 2/2002 | Adams | |
| 6,373,960 B1 | 4/2002 | Conover et al. | |
| 6,398,245 B1 * | 6/2002 | Gruse et al. ................. | 280/228 |
| 6,408,082 B1 | 6/2002 | Rhoads et al. ............. | 382/100 |
| 6,408,331 B1 | 6/2002 | Rhoads ........................ | 709/217 |
| 6,411,725 B1 | 6/2002 | Rhoads ........................ | 382/100 |
| 6,418,232 B1 | 7/2002 | Nakano et al. | |
| 6,425,081 B1 | 7/2002 | Iwamura | |
| 6,456,726 B1 | 9/2002 | Yu et al. ..................... | 382/100 |
| 6,466,670 B1 | 10/2002 | Tsuria et al. | |
| 6,477,707 B1 | 11/2002 | King et al. | |
| 6,499,105 B1 | 12/2002 | Yoshiura et al. | |
| 6,505,160 B1 | 1/2003 | Levy et al. .................. | 704/270 |
| 6,522,769 B1 | 2/2003 | Rhoads et al. ............. | 382/100 |
| 6,601,046 B1 | 7/2003 | Epstein | |
| 6,611,607 B1 | 8/2003 | Davis et al. ................. | 382/100 |
| 6,614,914 B1 | 9/2003 | Rhoads et al. ............. | 382/100 |
| 6,618,484 B1 | 9/2003 | Van Wie et al. | |
| 6,636,615 B1 | 10/2003 | Rhoads et al. | |
| 6,654,887 B1 | 11/2003 | Rhoads | |
| 6,664,976 B1 | 12/2003 | Lofgren et al. | |
| 6,694,025 B1 | 2/2004 | Epstein | |
| 6,721,440 B1 | 4/2004 | Reed et al. | |
| 6,728,390 B1 | 4/2004 | Rhoads et al. | |
| 6,748,533 B1 | 6/2004 | Wu et al. | |
| 6,785,815 B1 | 8/2004 | Serret-Avila et al. | |
| 6,807,285 B1 | 10/2004 | Iwamura | |
| 2001/0001613 A1 | 5/2001 | Hashimoto | |
| 2001/0017885 A1 | 8/2001 | Asai et al. | |
| 2001/0018742 A1 | 8/2001 | Hirai | |
| 2001/0021144 A1 | 9/2001 | Oshima et al. ........... | 369/13.02 |
| 2001/0024510 A1 | 9/2001 | Iwamura | |
| 2001/0026377 A1 | 10/2001 | Ikegami | |
| 2001/0026618 A1 | 10/2001 | Van Wie | |
| 2001/0032312 A1 | 10/2001 | Runje | |
| 2001/0033674 A1 | 10/2001 | Chen | |
| 2001/0037465 A1 | 11/2001 | Hart | |
| 2001/0044899 A1 | 11/2001 | Levy | |
| 2001/0047478 A1 | 11/2001 | Mase | |
| 2001/0051996 A1 | 12/2001 | Cooper et al. | |
| 2001/0054144 A1 | 12/2001 | Epstein et al. ............... | 713/161 |
| 2001/0055391 A1 | 12/2001 | Jacobs | |
| 2002/0010826 A1 | 1/2002 | Takahashi | |
| 2002/0013772 A1 | 1/2002 | Peinado | |
| 2002/0023058 A1 | 2/2002 | Taniguchi et al. | |
| 2002/0032502 A1 | 3/2002 | Russell ........................ | 700/214 |
| 2002/0032698 A1 * | 3/2002 | Cox ........................ | 707/501.1 |
| 2002/0033844 A1 | 3/2002 | Levy et al. | |
| 2002/0052885 A1 | 5/2002 | Levy | |
| 2002/0056081 A1 | 5/2002 | Morley | |
| 2002/0056118 A1 | 5/2002 | Hunter | |
| 2002/0059238 A1 | 5/2002 | Saito | |
| 2002/0061120 A1 | 5/2002 | Carr et al. ................... | 382/100 |
| 2002/0061122 A1 | 5/2002 | Fujihara et al. | |
| 2002/0062442 A1 | 5/2002 | Kurahashi | |
| 2002/0064759 A1 | 5/2002 | Durbin et al. ............... | 433/213 |
| 2002/0065781 A1 | 5/2002 | Hillegass | |
| 2002/0065832 A1 | 5/2002 | Mack | |
| 2002/0069359 A1 | 6/2002 | Wantanabe | |
| 2002/0069370 A1 | 6/2002 | Mack | |
| 2002/0071556 A1 | 6/2002 | Moskowitz et al. | |
| 2002/0080271 A1 | 6/2002 | Eveleens | |
| 2002/0080964 A1 | 6/2002 | Stone et al. | |
| 2002/0087885 A1 | 7/2002 | Peled | |
| 2002/0090114 A1 | 7/2002 | Rhoads et al. ............. | 382/100 |
| 2002/0091575 A1 | 7/2002 | Collart | |
| 2002/0091592 A1 | 7/2002 | Sugiura | |
| 2002/0107803 A1 | 8/2002 | Lisanke | |
| 2002/0108050 A1 | 8/2002 | Raley | |
| 2002/0111136 A1 | 8/2002 | McCoy | |
| 2002/0111878 A1 | 8/2002 | Namba et al. | |
| 2002/0114458 A1 | 8/2002 | Belenko | |
| 2002/0120515 A1 | 8/2002 | Morimoto et al. | |
| 2002/0120517 A1 | 8/2002 | Proidl | |
| 2002/0122567 A1 * | 9/2002 | Kuzmich et al. ........... | 382/100 |
| 2002/0138744 A1 | 9/2002 | Schleicher et al. ......... | 713/187 |
| 2002/0141584 A1 | 10/2002 | Razdan | |
| 2002/0146148 A1 | 10/2002 | Levy | |
| 2002/0152388 A1 | 10/2002 | Linnartz | |
| 2002/0165793 A1 | 11/2002 | Brand | |
| 2002/0168082 A1 * | 11/2002 | Razdan ........................ | 382/100 |
| 2002/0188841 A1 | 12/2002 | Jones et al. ................. | 713/153 |
| 2003/0009669 A1 * | 1/2003 | White et al. ................. | 713/176 |
| 2003/0009671 A1 * | 1/2003 | Yacobi et al. ............... | 713/176 |
| 2003/0012548 A1 | 1/2003 | Levy et al. | |
| 2003/0021439 A1 * | 1/2003 | Lubin et al. ................. | 382/100 |
| 2003/0032033 A1 | 2/2003 | Anglin et al. | |
| 2003/0037010 A1 | 2/2003 | Schmelzer | |
| 2003/0056103 A1 | 3/2003 | Levy et al. | |
| 2003/0076955 A1 | 4/2003 | Alve | |

| | | | |
|---|---|---|---|
| 2003/0078889 A1 | 4/2003 | Lee | |
| 2003/0084284 A1 | 5/2003 | Ando | |
| 2003/0088775 A1 | 5/2003 | Weimerskirch | |
| 2003/0098345 A1 | 5/2003 | Kobayashi et al. | |
| 2003/0103645 A1 | 6/2003 | Levy et al. | |
| 2003/0110126 A1 * | 6/2003 | Dunkeld et al. | 705/39 |
| 2003/0112974 A1 | 6/2003 | Levy | |
| 2004/0001606 A1 | 1/2004 | Levy | |
| 2004/0169892 A1 | 9/2004 | Yoda | |

FOREIGN PATENT DOCUMENTS

| | | |
|---|---|---|
| WO | WO 01/05075 | 1/2001 |
| WO | WO 0106703 | 1/2001 |
| WO | WO 0115021 | 3/2001 |
| WO | WO 0116671 | 3/2001 |
| WO | WO0176253 | 10/2001 |
| WO | WO 0207150 | 1/2002 |
| WO | WO0207425 | 1/2002 |
| WO | WO0207442 | 1/2002 |
| WO | WO 0211123 | 2/2002 |
| WO | WO02/19589 | 3/2002 |
| WO | WO 0227600 | 4/2002 |
| WO | WO 02/37489 | 5/2002 |
| WO | WO 0239713 | 5/2002 |
| WO | WO 0245286 | 6/2002 |
| WO | WO 02082271 | 10/2002 |

OTHER PUBLICATIONS

U.S. Appl. No. 09/636,102, filed Aug. 10, 2000, Ramos et al.

U.S. Appl. No. 60/349,970, Oct. 19, 2001 Levy et al.

Graser, "Paranoid Hollywood Wracked by Hack Attacks," Aug. 8, 2001, as reprinted by InfoSec News Aug. 9, 2001.

U.S. Appl. No. 09/404,291, filed Sep. 23, 1999, Levy.

U.S. Appl. No. 09/404,292, filed Sep. 23, 1999, Levy.

U.S. Appl. No. 09/571,422, filed May 15, 2000, Rhoads et al.

U.S. Appl. No. 09/574,726, filed May 18, 2000, Rhoads et al.

U.S. Appl. No. 09/625,577, Jul. 25, 2000, Carr et al.

Zhao, "A WWW Service to Embed and Prove Digital Copyright Watermarks," In Proc. of the European Conf. on Multimedia Applications, Services and Techniques, Louvain-La-Neuve, Belgium, May 1996, 14 pages.

Zhao, "WWW Copyright Labeling & Verification Service," (URL: http://sagittarius.igd.fhg.de:64325) Fraunhofer-IGD, Wilhelminenstr.7,D-64283 Darmstadt, 1 page.

* cited by examiner

DIGITAL WATERMARKING SYSTEMS AND METHODS

RELATED APPLICATION DATA

The present application is a continuation-in-part of U.S. patent application Ser. No. 10/017,678, filed Dec. 15, 2001 which is a continuation of U.S. patent application Ser. No. 09/597,209 filed Jun. 20, 2000 (now U.S. Pat. No. 6,411, 725). The Ser. No. 09/597,209 application is a continuation-in-part of U.S. patent application Ser. No. 09/408,902 filed Sep. 29, 1999 (now U.S. Pat. No. 6,408,331), which is a division of U.S. patent application Ser. No. 09/130,624 filed Aug. 6, 1998 (now U.S. Pat. No. 6,324,573), which is a continuation of U.S. patent application Ser. No. 08/508,083 filed Jul. 27, 1995 (now U.S. Pat. No. 5,841,978). The present application also claims the benefit of U.S. Provisional Patent Application No. 60/349,970, filed Oct. 19, 2001.

BACKGROUND AND SUMMARY OF THE INVENTION

In a recent article, "Paranoid Hollywood Wracked by Hack Attacks," author Marc Graser reported that "[h]ollywood is experiencing the revelation that everything it saves on a computer is available to prying eyes at any time. Nothing is safe. Paranoia is running rampant. Through legal (and freely accessible) software, anyone with a computer and an Internet connection can enter studio databases containing the most private information." (Reuters distributed Graser's article on Aug. 8, 2001.).

Graser continued "[r]ecent breaches have allowed hackers to exchange: rough-cuts of Warner Bros.' "Ocean's 11" and Columbia Pictures' Jet Li actioner "The One"; emails among executives at Warner Bros. TV; scripts transferred from production companies such as Bruckheimer Films; databases at agencies like Creative Artists Agency, Endeavor and William Morris; personal records at law corporations and accounting offices; and digitally stored media at New Line and VDI Multimedia." (See id.).

Piracy is raking showbiz in the tune of $1 trillion in damages annually. The film industry is losing $2.5 billion a year to piracy and the music industry is losing an additional $4.1 billion per year. (See id.).

Yet the biggest threat comes from money-hungry professionals, and company employees are increasingly to blame. See id. Graser reports that most companies do not realize that 90% of the attacks performed on the systems they try so hard to protect are the result of inside jobs.

A solution is needed to help curve the onslaught of movie theft and piracy, particularly theft from film studios and editing facilities.

Digital Watermarking can provide a deterrence and tracking solution.

Digital watermarking technology, a form of steganography, encompasses a great variety of techniques by which plural bits of digital data are hidden in some other object, preferably without leaving human-apparent evidence of alteration.

Digital watermarking may be used to modify media content (audio, video, images, etc.) to embed a machine-readable code into the media content. The media may be modified such that the embedded code is imperceptible or nearly imperceptible to a viewer, yet may be detected through an automated detection process.

There are many processes by which media content can be processed to encode a digital watermark. In media (e.g., digital audio or imagery—including video), the data may be encoded as slight variations in sample values. Or, if the object is represented in a so-called orthogonal domain (also termed "non-perceptual," e.g., MPEG, DCT, wavelet, etc.), the data may be encoded as slight variations in quantization values or levels. The present Assignee's U.S. Pat. No. 6,122,403 and application Ser. No. 09/503,881 (now U.S. Pat. No. 6,614,914) are illustrative of certain watermarking technologies. Of course, artisans in the digital watermarking field are familiar with other technologies that are suitably interchangeable with some aspects of the present invention.

Digital watermarking systems typically have two primary components: an embedding component that embeds a watermark in the media content, and a reading component that detects and reads the embedded watermark. The embedding component embeds a watermark pattern by altering data samples of the media content. The reading component analyzes content to detect whether a watermark pattern is present. In applications where the watermark encodes information, the reading component extracts this information from the detected watermark.

One problem that arises in many watermarking applications is that of object corruption. If the object is reproduced, or distorted, in some manner such that the content presented for watermark decoding is not identical to the object as originally watermarked, then the decoding process may be unable to recognize and decode the watermark. To deal with such problems, the watermark can convey a reference signal. The reference signal is of such a character as to permit its detection even in the presence of relatively severe distortion. Once found, the attributes of the distorted reference signal can be used to quantify the content's distortion. Watermark decoding can then proceed—informed by information about the particular distortion present.

The Assignee's U.S. patent application Ser. Nos. 09/503, 881 (now U.S. Pat. No. 6,614,914) and 09/452,023 (now U.S. Pat. No. 6,408,082) detail certain reference signals, and processing methods, that permit such watermark decoding even in the presence of distortion. In some image watermarking embodiments, the reference signal comprises a constellation of quasi-impulse functions in the Fourier magnitude domain, each with pseudorandom phase. To detect and quantify the distortion, the watermark decoder converts the watermarked image to the Fourier magnitude domain and then performs a log polar resampling of the Fourier magnitude image. A generalized matched filter correlates the known orientation signal with the re-sampled watermarked signal to find the rotation and scale parameters providing the highest correlation. The watermark decoder performs additional correlation operations between the phase information of the known orientation signal and the watermarked signal to determine translation parameters, which identify the origin of the watermark message signal. Having determined the rotation, scale and translation of the watermark signal, the reader then adjusts the image data to compensate for this distortion, and extracts the watermark message signal as described above.

To provide a comprehensive disclosure without unduly lengthening this specification, each of the patents and patent applications cited in this document are hereby incorporated by reference.

In one implementation of the invention, we provide steganographic markings for studio rough cuts. The marks provide nearly imperceptible identification and forensic tracking clues.

In another implementation, content is marked with serialized or unique codes efficiently using different objects for the content and watermark data via object based encoding systems such as MPEG-4. The watermark object can be efficiently created if the original compressed content is analyzed and perceptual model results and calibration signals that are constant when a watermark payload is changed are saved. This or another forensic embedding system can be used to track content as well as lock content to a recipient. For example, the content may be rendered only if the individual or their rendering device has a secret code that coincides with the embedded ID.

With the foregoing by way of background and summary, the specification next turns to various digital watermarking improvements. It will be recognized that these improvements can typically be employed in many applications, and in various combinations with the subject matter of the patent documents cited herein. These improvements will be more readily apparent from the following detailed description, which proceeds with reference to the accompanying drawings.

DETAILED DESCRIPTION

Consider a typical film production process. After shooting on location, the resulting film is digitized or converted to a digital format. (Or digital images can be initially captured. Of course, there are special effects and other effects filters (e.g., a flame effect filter) that are essentially produced in the digital domain.). The digitized film (and any special effects scenes) represents the many scenes that will be edited to create a movie, video or other viewing program. We refer to this collection of digital scenes as a "master cut." This master cut can be further refined into so-called rough-cuts, in which a movie sequence begins to take shape.

Often, rough-cuts are provided to editors and effects specialists. Similarly, rough-cuts are often provided to directors, critics, executives, advertisers, etc. One aspect of the present invention helps to identify and track rough-cuts as they are distributed from a studio.

A conventional security feature provides a digital "bug" or label that visually appears in a corner (or other) screen position of a rough-cut. Or the rough-cut includes a visible banner-like text message throughout each scene or frame. These techniques are easily defeated by pirates through simple cropping and editing techniques.

According to one aspect of the present invention, a rough-cut is digitally watermarked, particularly when communicated to a non-secure location. Even rough-cut copies that are "checked-out" as a file, instead of rendering (or streaming) to a network workstation, can be digitally watermarked. The digital watermark is preferably redundantly embedded throughout the rough-cut, or the watermark can be placed in only specific frames or placed to cover certain film segments or video objects. Preferably, the digital watermark includes an identifier. Suitable watermarking techniques are disclosed in the applications and patents mentioned above. In some implementations, other digital watermarking techniques can be suitably interchanged with this aspect of the present invention, so long as the watermark conveys sufficient payload capacity.

A digital watermark identifier preferably uniquely identifies a rough-cut version (e.g., cut 1 of 12, date/time, editing details, distribution trail, etc.). Alternatively (or additionally), the identifier uniquely identifies a party to which the rough-cut is being transferred. The identifier is stored in a database or other record to facilitate tracking. The identifier is associated in the database with information relating to the rough-cut or to the receiving party. (The data record can include additional information such as time of rough-cut checkout, distribution/rendering channel, usage restrictions, etc.). Thereafter, when the rough-cut is found in an unexpected or unauthorized location, e.g., a web site, video store shelf, competitor's studio, counterfeited DVD, etc., the embedded watermark identifier is extracted and used to interrogate the database. The database information is retrieved and the source of the leak or distribution channel can be identified.

Figure 1:
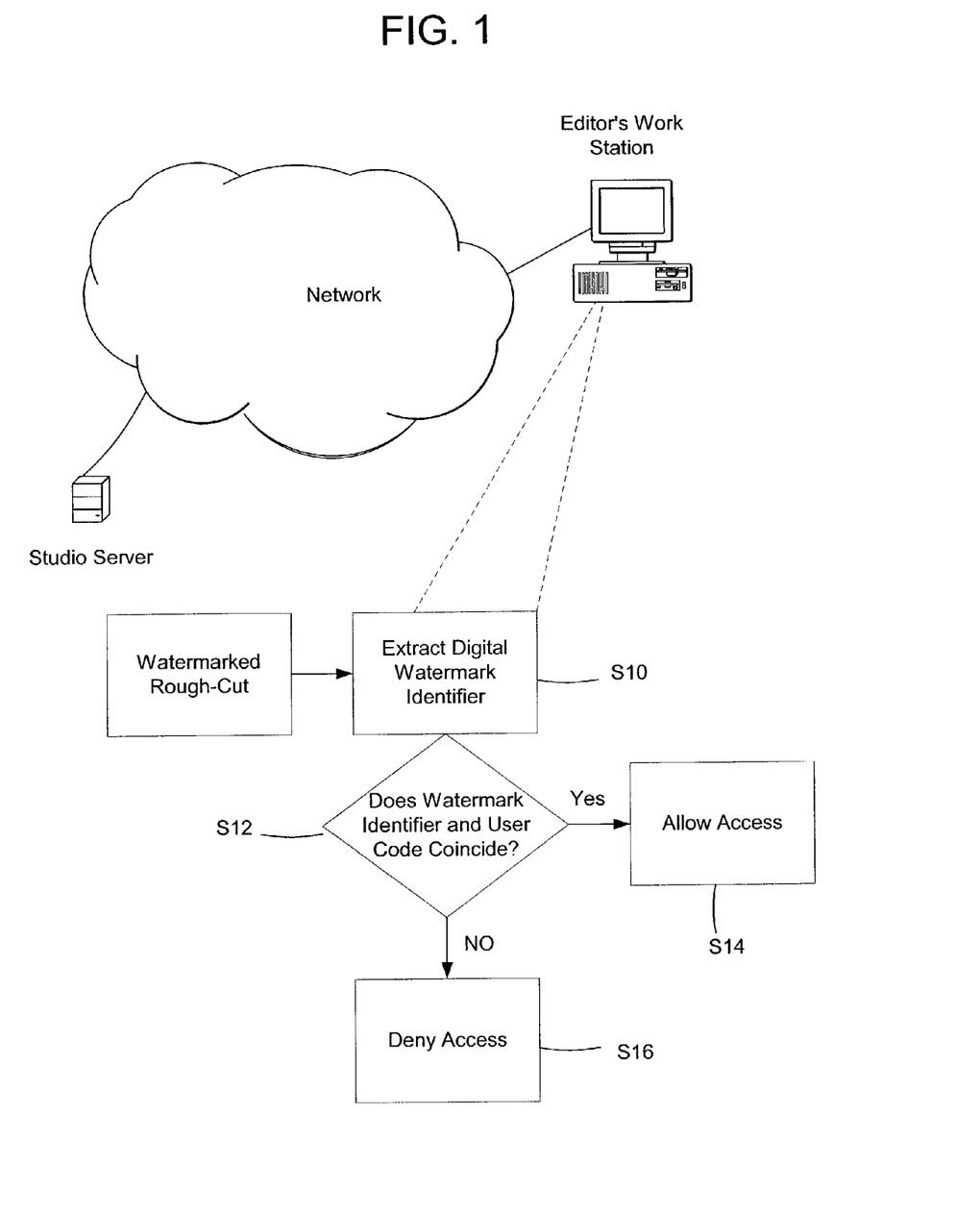
FIG. 1 is a diagram illustrating a network system, including a flow diagram for a security procedure.

In another embodiment, the identifier is used as a security feature to prevent unauthorized viewing or handling. With reference to FIG. 1, a rough-cut is transferred from a network studio to a user workstation (e.g., editor, director, etc.) via a network. The transfer can occur through a conventional network, such as a wide area network, local area network, private network, wireless network, or even the Internet. Alternatively, the user receives the rough-cut on physical media. The rough-cut includes a digital watermark embedded therein. Of course, a digital watermark can be redundantly embedded throughout the cut.

Access to the rough-cut is regulated by a software security application operating on the user's workstation. The software security application can be integrated with software editing tools such as Adobe Premier, Affects Effects and Media100 products, among others. The security software preferably includes (or cooperates with) a digital watermark reader. The reader can be a plug-in or an independent software application. The watermark reader extracts the digital watermark identifier (S10) from the rough-cut and the user is prompted to enter a corresponding code. The code is preferably rough-cut specific in that a user has (or receives from a studio) a code that corresponds only to a digital watermark identifier embedded in her rough-cut. Once entered, the watermark detector determines whether the identifier and code coincide (S12). If the code and watermark identifier coincide, the user is granted access to the rough-cut (S14). Else, the user is denied access (S16). The code and watermark ID need not perfectly match to coincide. Indeed, the code and identifier can be related via a hash, mathematical relationship or algorithm. Or the code/identifier can be related by a symmetrical or asymmetrical encryption key.

In other implementations, the code is cached on the editor's computer (or video rendering device), e.g., like storing so-called web cookies that securely store account IDs and passwords on a user's terminal, so the code does not need to be manually entered each time. In addition, the code can be locked (or tied) to a computer, such as including the date of a Windows garbage can. In one implementation, the computer is secure, requiring the user to enter a password and/or pass biometrics, such as a fingerprint scan or security dongle or card, such that other users do not have access to the cached ID. In other words, only a specified user can use the cached ID, even though it is stored on the PC since the cache is locked for access only by a qualifying PC user. In another implementation, the code is implicitly part of a computer system, such as a private cryptography key. In this case, the code is used to decrypt or otherwise unscramble the rough-cut or the digital watermark embedded in the rough cut or both.

As will be appreciated, an editing process typically involves the creation of an instruction set, which is used to create a final cut. The instruction set outlines (e.g., by codes or markers) the editor's edits, cuts, etc. Most often the instruction set is applied against a high quality cut to create the final cut (or further rough-cuts). Of course, a final cut can likewise be watermarked.

In still another implementation of this aspect of the present invention, an editor's rendering device (e.g., personal computer executing editing software instructions, set-top-box or other device) embeds a watermark identifier in a rough-cut. The identifier is preferably unique to the editor or to a team of editors. Accordingly, if the rough-cut is discovered in an unanticipated or unauthorized channel, the watermark identifier, once extracted, can be used to track the source of the leak.

Consider a modification of this implementation for adaptation to a peer-to-peer (P2P) network environment. When presenting a pre-release movie clip in a P2P network, e.g., like x-ShareThis, every ShareThis client that handles (or routes) the movie clip digitally watermarks the clip with a unique identifying watermark (e.g., a unique serial number, etc.). Illegal or unauthorized copies of the movie clip can be traced through the peer lineage of the unique identifiers.

Transactional Watermarks: A System Level Approach

Forensic tracking can be facilitated by watermarking each version or content copy with a transaction ID. Content is defined broadly herein and may include audio, video, data, images or multimedia combinations. A transaction (or dynamic) identifier preferably includes multi-bit data that uniquely identifies a user, a user device or a transaction. In some cases the transaction identifier serves as a database interrogator to retrieve additional information. (Forensic tracking involves identifying content and/or tracking a distribution source or history of the content. Forensic tracking can also involve uniquely serializing content to a user or user device. Forensic tracking is particularly helpful in identifying content or a distribution source when the content is discovered in an unexpected or unauthorized channel or location.). A content owner may want a serial account of each content copy, or to tie the content to an end-user or playing device ID. This requirement means that the content is preferably watermarked on the fly at the server with video streamed over IP, or at a set-top box (STB) in broadcast video system.

Some robust watermark embedding algorithms are too computationally intensive for this approach and/or adversely degrade content. For broadcast video, a set-top-box (STB) is designed to be as inexpensive as possible, but for use in a watermark embedding/decoding system, the STB must contain enough computational resources for a watermark embedder and/or decoder. For video streamed over IP, compressed content is often digitally watermarked on a server, which may require the content to be decompressed, watermarked and re-compressed. These steps are not only computationally intense but may also degrade the content.

Looking at a complete system, we have invented improvements for efficiently embedding a transaction ID in content. Our improvements are discussed below.

Watermarking Compressed Content

Digitally watermarking compressed audio, video or images, where a watermark ID can dynamically change (e.g., potentially to identify a user, transaction or requesting/rendering device), presents computational and content degradation (due to a re-compression) challenges. Conventional approaches often require content to be decompressed, watermarked and recompressed.

Our improvements and solutions to these challenges are expressed in the following two embodiments.

First Embodiment

Our first embodiment is discussed with reference to FIG. 2. Compressed content 100 is decompressed 110. A watermark including a dynamic identifier 140 is determined (or constructed) for the decompressed content 120. Preferably, a dynamic identifier (or transaction identifier) uniquely identifies a particular user or user device. Or the dynamic identifier can be unique to a particular transaction in a receipt-like manner. Optionally, the dynamic identifier is associated in a database with additional information such as user information, distribution channel, content usage rights, transaction details, account information, etc. (Once decoded, the dynamic identifier is used to interrogate the database to retrieve the additional information.). The watermark is compressed as a separate object 130, such as defined in MPEG-4, without being embedded in the decompressed content. Two objects—namely the original compressed content and the compressed watermark—are communicated to a rendering device (e.g., personal computer, media player, set-top-box, DVD, or other consumer device) 150. In one example, a copy of the original compressed content 100 is retained, so as to avoid recompressing the decompressed original content. The objects can be communicated via a network, such as the Internet or a LAN or WAN. In a network environment, steps 100–140 are preferably carried-out on a network server.

The rendering device combines the two objects 160. For example, the objects can be decompressed and the content can be embedded with the watermark by a watermark embedded associated with the rendering device. The watermark object can include embedding hints, such a spatial or frequency-embedding clues, start sequences or points, etc. Or the two objects can be associated or linked together, e.g., with a header or file structure. Still further, the content and watermark can be otherwise combined, e.g., during rendering or storing.

The first embodiment associates a dynamic ID with content without recompressing the original content. The decompressed content 110 can be optionally saved on the network server so that the decompressing step is skipped for following transactions involving the same original content, thus reducing computational requirements.

Although not required, it is preferable that the two objects, i.e., the original compressed content and the compressed watermark, are delivered as a secure stream to a secure player (or rendering device) so that a would-be pirate cannot restrict or separate the watermark from the content.

Second Embodiment

Figure 2:
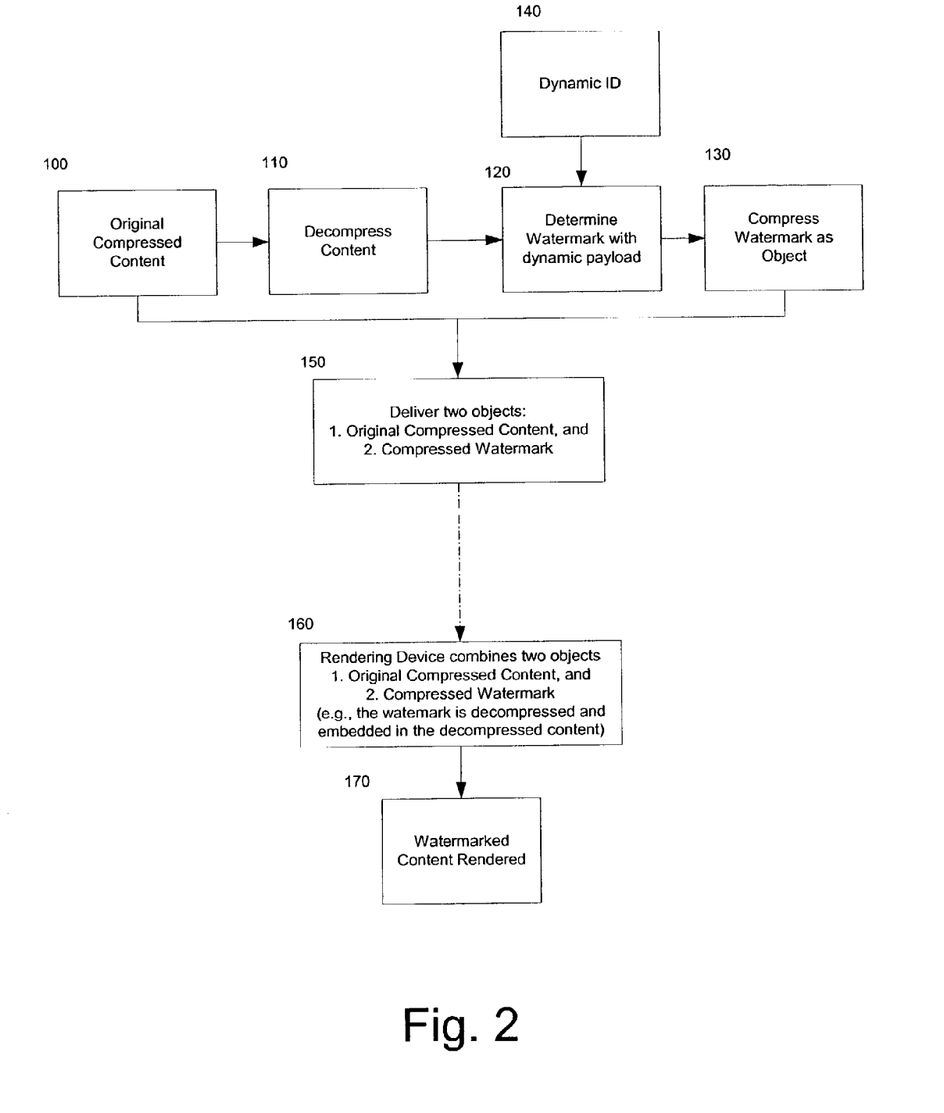
FIG. 2 is a block diagram illustrating a transaction procedure.

Our second embodiment is described with reference to FIG. 3, where like stages/steps are numbered with the same reference numbers as shown in FIG. 2. This embodiment includes a pre-computation stage, where original compressed content 100 is decompressed 110. Static watermark features and/or embedding instructions are determined 220. For example, the static watermark signal many include features based on perceptual modeling of the content, or may include watermark orientation or reference signals. The watermark features (e.g., perceptual model and/or orientation signal) are saved in a related file 230. Preferably, the related file contains those watermarking features that do not change when the transactional (or dynamic) ID changes. With these features saved in related file 230, the original content does not need to be again decompressed. Overall computational time can be reduced by saving such a related file in the pre-computational stage. This related file 230 is preferably saved for future requests for the same original content 100, saving additional computational time.

Then, in a transaction stage, where the content 100 is delivered to a user, a watermark is efficiently created 120 using the related file 230 (including the perceptual model and/or orientation signal). The watermark preferably includes a watermark identifier based on a dynamic ID 140. As in the first embodiment, the dynamic or transactional ID uniquely identifies the user, user device or the transaction. The watermark is compressed 130 and sent as an object with the original compressed content 150 as discussed above with respect to FIG. 2. As such, in the transaction stage, the original compressed file need not be decompressed. In other words, the content file needs to be decompressed and analyzed for perceptual features only once, while the distributed versions can be watermarked with numerous IDs.

Additionally, in step 160, the watermark can efficiently be read before being added to the content. This reading will be very efficient and robust. Even if the watermark is read after being combined with the content, the watermark ID can be used to produce so-called hot-branding, where a related central database produces a dynamic brand logo to appear with the content, such as a logo in video or images and audio with audio.

Modifications

We also envision that the original compressed content may be encrypted. When encrypted, decryption does not have to be performed, except initially in the pre-computational stage when the related file 230 is created. This is both more efficient and more secure than having to decrypt the content to add the watermark during each subsequent transaction. As with the first embodiment, if the decompressed content is saved, the system is more efficient, but not necessarily more secure since non-secure content is available on the server.

Figure 3:
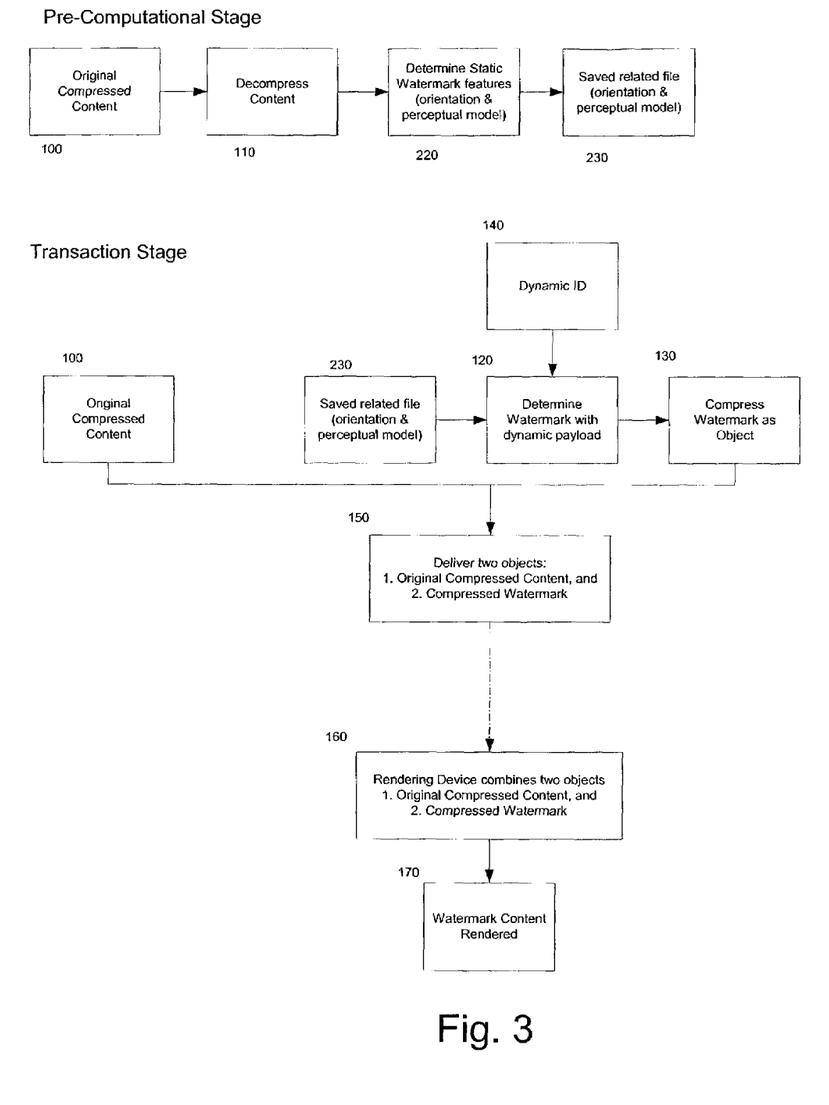
FIG. 3 is a block diagram illustrating another transaction procedure, include a pre-computational stage.

As an optional feature for the FIG. 2 and FIG. 3 embodiments, the content is embedded with a watermark content ID, and optionally with a distributor ID, before it is broadcast or streamed. This process need only occur once and not each time it is streamed. For example, a watermark-embedding step is included after decompression 110. Or the illustrated transaction processes act on compressed content that has been previously watermarked. The individual dynamic or transaction ID is then determined according to the FIG. 2 and FIG. 3 embodiments.

As will be appreciated, in the FIG. 2 and FIG. 3 embodiments, the original content and watermark objects are securely combined at a rendering device, thus creating a uniquely identified content display (e.g., such as a video display).

It also should be appreciated that the FIG. 2 and FIG. 3 transaction systems are envisioned to handle many transfers of the same original content to many different users (or rendering devices). A unique dynamic or transaction identifier is preferably generated for each transfer or for each user.

With reference to FIG. 2, in an alternative embodiment, the original content 100 includes a digital watermark, and the watermark is extracted and supplemented with a dynamic (or transactional) identifier in step 120.

CONCLUSION

The foregoing are just exemplary implementations of the present invention. It will be recognized that there are a great number of variations on these basic themes. The foregoing illustrates but a few applications of the detailed technology. There are many others.

To provide a comprehensive disclosure without unduly lengthening this specification, each of the above-mentioned patents and patent applications, along with U.S. patent application Ser. Nos. 09/574,668 (now U.S. Pat. No. 6,522,769), 09/620,019, 09/636,102, 60/257,822, and 09/574,668 (now U.S. Pat. No. 6,522,769), are hereby incorporated by reference. Applicants also herein incorporate by reference Assignee's U.S. patent Application titled "Integrating Digital Watermarks in Multimedia Content," filed concurrently herewith (now application Ser No. 10/277,617, published as US 2003-0103645 A1). The particular combinations of elements and features in the above-detailed embodiments are exemplary only; the interchanging and substitution of these teachings with other teachings in this application and the incorporated-by-reference patents/applications are expressly contemplated.

Many of the above-described methods and related functionality can be facilitated with computer executable software stored on computer readable media, such as electronic memory circuits, RAM, ROM, EPROM, flash memory, magnetic media, optical media, magnetic-optical media, memory sticks, hard disks, removable media, etc., etc. Such software may be stored and/or executed on a general-purpose computer, or on a server for distributed use. Also, instead of software, a hardware implementation, or a software-hardware implementation can be used.

While the first aspect of the present invention has been described with respect to editor rough-cuts, the invention is not so limited. Indeed, any movie segment, trailer, preview, or confidential documents can be watermarked. Also, while the rough-cuts are described as if in a digital format, they need not be so. Instead, the rough-cuts can be film, which includes a digital watermark identifier embedded therein. It also should be appreciated that the watermark embedding can occur while the rough-cut is being rendered.

Also, a studio rough-cut can include a plurality of watermarks. For example, the rough-cut may include a content identifying watermark, which uniquely identifies the content, and a user specific watermark, which uniquely identifies the user. The studio rough-cut can also include a so-called semi-fragile digital watermark. A semi-fragile watermark is designed such that it can withstand routine signal processing (e.g., compression) but is destroyed or degrades predictably with a malicious attack. The status of a fragile watermark in a studio rough-cut will help to announce a copy.

In view of the wide variety of embodiments to which the principles and features discussed above can be applied, it should be apparent that the detailed embodiments are illustrative only and should not be taken as limiting the scope of the invention.

What is claimed is:

1. A method of protecting a pre-final movie version with digital watermarking, the pre-final movie version to be communicated from a first storage site to a second storage site, the second storage site being remote from the first storage site, said method comprising:
   redundantly embedding a digital watermark in the pre-final movie version, the digital watermark including a unique identifier;

providing a user or the second storage site with a code that is uniquely associated with the identifier; and communicating the watermarked pre-final movie version to the second storage site.

2. The method of claim 1, wherein the second storage site comprises a computer, said computer further comprising a security program to regulate access to the watermarked pre-final movie version.

3. A method of accessing the pre-final movie version of claim 2, comprising:

decoding the digital watermark to obtain the unique identifier;

providing the code to the security program; and correlating the unique identifier with the code to determine whether to allow access to the pre-final movie version.

4. The method of claim 3, wherein access is granted to the pre-final movie version when the identifier and code correspond.

5. The method of claim 3 wherein access to the pre-final movie version is allowed when the code decrypts at least one of the pre-final movie version and the digital watermark.

6. A method of accessing the pre-final movie version of claim 2, wherein the computer comprises the code cached therein, said method comprising:

upon receipt of the pre-final movie version, decoding the digital watermark to obtain the identifier;

automatically providing the cached code to the security program, the security program determining whether the code and the identifier coincide prior to allowing access to the pre-final movie version.

7. The method of claim 6, wherein the computer comprises at least one of a password, dongle and biometric-based access system, the computer only allowing access to a user having a predetermined password, necessary dongle or predetermined biometric input.

8. The method of claim 2, wherein the pre-final movie version comprises a studio rough-cut.

9. The method of claim 8, wherein the first storage site comprises a movie studio computer storage device, and the second storage site computer is associated with at least one of an editor, director or critic of the rough-cut.

10. The method of claim 1, wherein the code and the pre-final movie version are separately provided to the user or the second storage site.

11. The method of claim 1, wherein said redundantly embedding a digital watermark in the pre-final movie version occurs as the pre-final version is communicated to the second storage site.

12. The method of claim 1, further comprising embedding another digital watermark in the pre-final movie version prior to communicating the pre-final movie version to the second storage site.

13. The method of claim 12, wherein the another digital watermark comprises a payload identifying at least one of the pre-final movie version, the user and a communications channel.

14. A method of watermarking a pre-final movie version communicated according to the method of claim 1, comprising upon or after receipt of the pre-final movie version, watermarking the pre-final movie version with another digital watermark, the another digital watermark identifying at least one of the user and the second storage site.

15. The method of claim 1, wherein the pre-final movie version comprises an encrypted form when communicated to the second storage site, and wherein the code comprises at least a decryption key.

16. A method of operating a peer-to-peer (P2P) network, the network communicating an audio clip or video segment, the P2P network comprising at least a first and a second computer, the first and second computer communicating with each other via the network, each of the computers including a watermark embedder, wherein the audio clip or video segment includes a digital watermark redundantly embedded therein, the digital watermark including a first identifier that uniquely identifies at least a distribution or user record that is associated with the audio clip or video segment, said method comprising:

after receipt of the audio clip or video segment at the first computer, digitally watermarking the audio clip or video segment to include a second identifier, the second identifier uniquely identifying the first computer or a user associated with the first computer; and after receipt of the audio clip or video segment from the first computer to the second computer, digitally watermarking the audio clip or video segment to include a third identifier, the third identifier uniquely identifying the second computer or a user associated with the second computer.

17. The method of claim 16, wherein each of the first and second computers comprises a watermark decoder, said method further comprising:

correlating a code with the first watermark identifier to determine whether a user has permission to access the audio clip or video segment.

18. A method of protecting a pre-final movie version with digital watermarking, the pre-final movie version to be communicated from a first storage site to a second storage site, the second storage site being remote from the first storage site, said method comprising:

embedding a first digital watermark component in the pre-final movie version, the first digital watermark component including a unique identifier associated with at least one of a user and the second storage site;

embedding at least a second digital watermark component in the pre-final movie version, the second digital watermark component identifying at least one of the pre-final movie version, an entity associate with the pre-final movie version, and a communications channel;

providing the user or the second storage site with a code that is uniquely associated with the unique identifier; and communicating the watermarked pre-final movie version to the second storage site.

19. The method of claim 18, wherein the first digital watermark component is redundantly embedded in the pre-final movie version.

20. The method of claim 19, wherein the second digital watermark component is redundantly embedded in the pre-final movie version.

21. The method of claim 18, wherein the code and the pre-final movie version are separately provided to the user or the second storage site.

22. The method of claim 18, wherein the pre-final movie comprises an encrypted form when communicated to the second storage site, and wherein the code comprises at least a decryption key.

23. A method of protecting a pre-release movie or audio with steganographic indicia the pre-release movie or audio to be provided from a first site to a second site, the second site being remotely located from the first site, said method comprising:

embedding a steganographic code in the pre-release movie or audio, the steganographic code including a unique identifier;
encrypting the embedded pre-release movie or audio according to an encryption key;
providing the encrypted embedded pre-release movie or audio to the second site; and
providing, separately from the encrypted embedded pre-release movie or audio, a user or the second site with a code that is uniquely associated with at least the encrypted embedded pre-release movie or audio.

24. The method of claim 23, wherein the code comprises at least a decryption key.

25. A method of accessing the pre-release movie or audio communicated according to claim 24, said method comprising:
decrypting at least a portion of the pre-release movie or audio with the decryption key;
decoding the digital watermark from the decrypted portion of the pre-release movie or audio to obtain the unique identifier; and
correlating the unique identifier with the code to determine whether to allow access to the pre-release movie or audio.

26. The method of claim 25, wherein a software application executed by a computer processor carries out the method of claim 25.

27. The method of claim 23, wherein the code is uniquely associated with the encrypted watermarked pre-release movie or audio via a decryption key.

28. The method of claim 23, wherein said providing the encrypted watermarked pre-release movie or audio to the second site comprises communicating the encrypted watermarked pre-release movie or audio to the second site via a network.

29. The method of claim 23 wherein the steganographic code is redundantly embedded in the pre-release movie or audio.

30. A method of protecting a pre-release movie or audio with digital watermarking, the pre-release movie or audio to be provided from a first site to a second site, the second site being remotely located from the first site, said method comprising:
embedding a digital watermark in the pre-release movie or audio, the digital watermark including a unique identifier;
encrypting the watermarked pre-release movie or audio according to an encryption key;
providing a user or the second site with a code that is uniquely associated with at least the encrypted watermarked pre-release movie or audio, wherein the code is uniquely associated with the encrypted watermarked pre-release movie or audio via the identifier; and
providing the encrypted watermarked pre-release movie or audio to the second site.

31. The method of claim 30 wherein the digital watermark is redundantly embedded in the pre-release movie or audio.

32. A method of protecting a pre-release movie or audio with digital watermarking, the pre-release movie or audio to be provided from a first site to a second site, the second site being remotely located from the first site, said method comprising:
embedding a digital watermark in the pre-release movie or audio, the digital watermark including a unique identifier;
encrypting the watermarked pre-release movie or audio according to an encryption key;
providing a user or the second site with a code that is uniquely associated with at least the encrypted watermarked pre-release movie or audio, wherein the code is uniquely associated with the encrypted watermarked pre-release movie or audio via both the identifier and a decryption key; and
providing the encrypted watermarked pre-release movie or audio to the second site.

33. The method of claim 32 wherein the digital watermark is redundantly embedded in the pre-release movie or audio.

34. A method of protecting a pre-release movie or audio with digital watermarking, the pre-release movie or audio to be provided from a first site to a second site, the second site being remote from the first site, said method comprising:
embedding a first digital watermark component in the pre-release movie or audio, the first digital watermark component including a unique identifier associated with at least one of a user and the second site;
embedding at least a second digital watermark component in the pre-release movie or audio, the second digital watermark component identifying at least one of the pre-release movie or audio, an entity associate with the pre-release movie or audio, and a communications channel;
providing the user or the second site with a code that is uniquely associated with at least the unique identifier; and
providing the watermarked pre-release movie or audio to the second site.

35. The method of claim 34, wherein the first digital watermark component is redundantly embedded in the pre-release movie or audio.

36. The method of claim 35, wherein the second digital watermark component is redundantly embedded in the pre-release movie or audio.

37. The method of claim 34, wherein the code and the pre-release movie or audio are separately provided to the user or the second site.

38. The method of claim 34, further comprising encrypting the twice watermarked pre-release movie or audio prior to providing the watermarked pre-release movie or audio to the second site.

39. The method of claim 38, wherein the code comprises at least a decryption key.

40. A method of accessing the pre-release movie or audio communicated according to claim 39, said method comprising:
decrypting at least a portion of the pre-release movie or audio with the decryption key;
decoding the first digital watermark component from the decrypted portion of the pre-release movie or audio to obtain the unique identifier; and
correlating the unique identifier with the code to determine whether to allow access to the pre-release movie or audio.

41. The method of claim 34, wherein said providing the watermarked pre-release movie or audio to the second site comprises communicating the watermarked pre-release movie or audio to the second site via a network.

42. A method of protecting a pre-release movie or audio with digital watermarking, the pre-release movie or audio to be provided from a first site to a second site, the second site being remotely located from the first site, said method comprising:
embedding a digital watermark in the pre-release movie or audio, the digital watermark including a unique identifier;

encrypting the watermarked pre-release movie or audio according to an encryption key;

providing a user or the second site with a code that is uniquely associated with at least the encrypted watermarked pre-release movie or audio, wherein the unique identifier is uniquely associated with at least one of the user and second site; and providing the encrypted watermarked pre-release movie or audio to the second site.

43. The method of claim 42 wherein the digital watermark is redundantly embedded in the pre-release movie or audio.

\* \* \* \* \*

UNITED STATES PATENT AND TRADEMARK OFFICE
CERTIFICATE OF CORRECTION

| | | |
|---|---|---|
| PATENT NO. | : 7,006,661 B2 | Page 1 of 1 |
| APPLICATION NO. | : 10/278742 | |
| DATED | : February 28, 2006 | |
| INVENTOR(S) | : Miller et al. | |

It is certified that error appears in the above-identified patent and that said Letters Patent is hereby corrected as shown below:

Please add to the cover sheet of the patent: --(73) Assignee: Digimarc Corporation, Beaverton, OR (US)--.

Page 1, Related U.S. Application Data (60), change "Pat. No. 5,841,978, application No. 10/278,742." --to Pat. No. 5,841,978.--.

Column 3, line 30, change "procedure, include a" to --procedure, including a--.

Column 6, lines 4-5, change "decompressed, watermark and recompressed" to --decompressed, watermarked and recompressed--.

Column 6, line 62, change "signal many include" to --signal may include--.

Signed and Sealed this
Twenty-ninth Day of May, 2012

David J. Kappos
*Director of the United States Patent and Trademark Office*